(12) United States Patent
Tomura

(10) Patent No.: US 6,196,357 B1
(45) Date of Patent: Mar. 6, 2001

(54) STRUCTURE FOR ARRANGING PARKING-BRAKE LEVER

(75) Inventor: Hitoshi Tomura, Kanagawa-ken (JP)

(73) Assignee: Nissan Motor Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/127,845

(22) Filed: Aug. 3, 1998

(30) Foreign Application Priority Data

Aug. 11, 1997 (JP) ................................................. 9-216461

(51) Int. Cl.⁷ ...................................................... B60T 1/00
(52) U.S. Cl. ........................ 188/2 D; 74/500.5; 74/501.6; 74/471 R; 74/502.6
(58) Field of Search .............................. 188/2 D; 74/502, 74/501.6, 500.5, 471 R, 502.6

(56) References Cited

U.S. PATENT DOCUMENTS

| 3,897,694 | * | 8/1975 | Hirst, Jr. .................................. 74/502 |
| 4,379,500 | * | 4/1983 | Kamino ................................. 188/2 D |
| 4,428,613 | * | 1/1984 | Nomura .................................. 74/502 |
| 5,690,193 | * | 11/1997 | Baummann et al. ................. 74/501.5 |
| 5,910,194 | * | 6/1999 | Cho ...................................... 74/500.5 |

FOREIGN PATENT DOCUMENTS 9-66819    3/1997   (JP) .

* cited by examiner

Primary Examiner—Robert J. Oberleitner
Assistant Examiner—Devon Kramer
(74) Attorney, Agent, or Firm—McDermott, Will & Emery

(57) ABSTRACT

A parking brake mounted selectively to a first position on a floor of an automobile body and a second position in front of the first position on the floor. Fitting hole is formed on the floor at the back of the first position. A pipe member is fitted into the fitting hole and has opening area formed like a substantial flare shape to be expanded forward at their front end. The opening area is opened over the floor of the automobile body. A cable is connected to the parking brake and then extended backward into the inside of the floor via the opening area. Accordingly, even when the parking brake is mounted to either of the first position and the second position, the cable is extended from the upper surface side of the floor to the back surface side thereof through the opening area of the pipe member. Since the opening area of the pipe member has a substantial flare shape, the cable is introduced smoothly into the inside of the floor even though the cables are strung obliquely to the pipe member. As the parking brake is mounted to either of the first position and the second position, the number of parts and the tare is reduced because a large size through bracket is not needed.

12 Claims, 3 Drawing Sheets

STRUCTURE FOR ARRANGING PARKING-BRAKE LEVER

The content of Application No. TOKUGANHEI 9-216461 filed on Aug. 11, 1997 in Japan is hereby incorporated by reference.

BACKGROUND OF THE INVENTION

The present invention relates to a structure for arranging a parking-brake lever.

The parking-brake lever (abbreviated as a "PKB lever" hereinafter) is mounted on an upper surface of a floor tunnel provided on a floor of an automobile. A cable is extended from the PKB lever and branched off into two cables via an equalizer arranged on the floor tunnel. Such two cables are connected to parking-brake mechanisms which are provided to right and left rear wheels respectively (see Patent Application Publication (KOKAI) Hei 9-66819 as a similar technology).

With respect to the PKB lever of this kind, as the PKB lever arranging position, in order to be used commonly in both the automobile equipped with a right-hand steering wheel and the automobile equipped with a left-hand steering wheel, there are a first position provided in a center area of an upper surface of the floor tunnel in the width direction of the automobile, a second position provided exclusively to the automobile with the right-hand steering wheel in a right side area in the width direction of the automobile in front of the first position, and a third position provided exclusively to the automobile with the left-hand steering wheel in a left side area in the width direction of the automobile in front of the first position.

In order to respond to such three positions in a series of automobiles, a large opening area is formed on the upper surface of the floor tunnel. In the case of the first position, the PKB lever is mounted directly in the opening area, and then the cable extended from the PKB lever is branched off via the equalizer so as to extend to the right and left rear wheels. In the case of the second position or the third position, the PKB lever is mounted to each position and then the cable is extended from the PKB lever via a dedicated through bracket provided in the opening area so as to pass through the floor tunnel and then is branched off via the equalizer so as to extend to the right and left rear wheels.

SUMMARY OF THE INVENTION

However, the above related art, in case the PKB lever is mounted to the second position or the third position, needs the dedicated through bracket to be fitted in the opening area, whereby the number of parts is increased. In addition, since the opening area must be formed large in size so as to mount the PKB lever directly to the first position, the through bracket to be fitted in the opening area is also increased in size. Because of such large through bracket, the tare, i.e., total automobile weight has been increased correspondingly.

Therefore, it is an object of the present invention to provide a structure for arranging a parking-brake lever capable of reducing the number of parts and the tare.

In order to achieve the above object, the structure according to the present invention comprises a parking brake, a fitting hole, a pipe member, and a cable. The parking brake mounted selectively to a first position on a floor of a automobile body and a second position in front of the first position on the floor. The fitting hole is formed on the floor in back of the first position. The pipe member is fitted into the fitting hole and has opening area formed like a substantial flare shape expanded forward at front end thereof. The opening area is opened over the floor of the automobile body. The cable is connected to the parking brake and then extended backward to the inside of the floor via the opening area.

According to the above configuration, the pipe member is fitted into the fitting hole formed on the floor, so that the upper and under arias of the floor are connected via the opening area of the pipe member. The cable, which is extended from the parking brake being mounted to either of the first position and the second position, is introduced into the inside of the floor via the pipe member. Since the opening area of the pipe member has a substantial flare shape, the cable extended from the second position is introduced smoothly into the inside of the floor even if the cable is strung obliquely to the pipe member. If the parking brake is mounted to either of the first position and the second position, a large size through bracket is not needed. As s result, the number of parts and the tare are reduced.

DESCRIPTION OF THE PREFERRED EMBODIMENT

Figure 1:
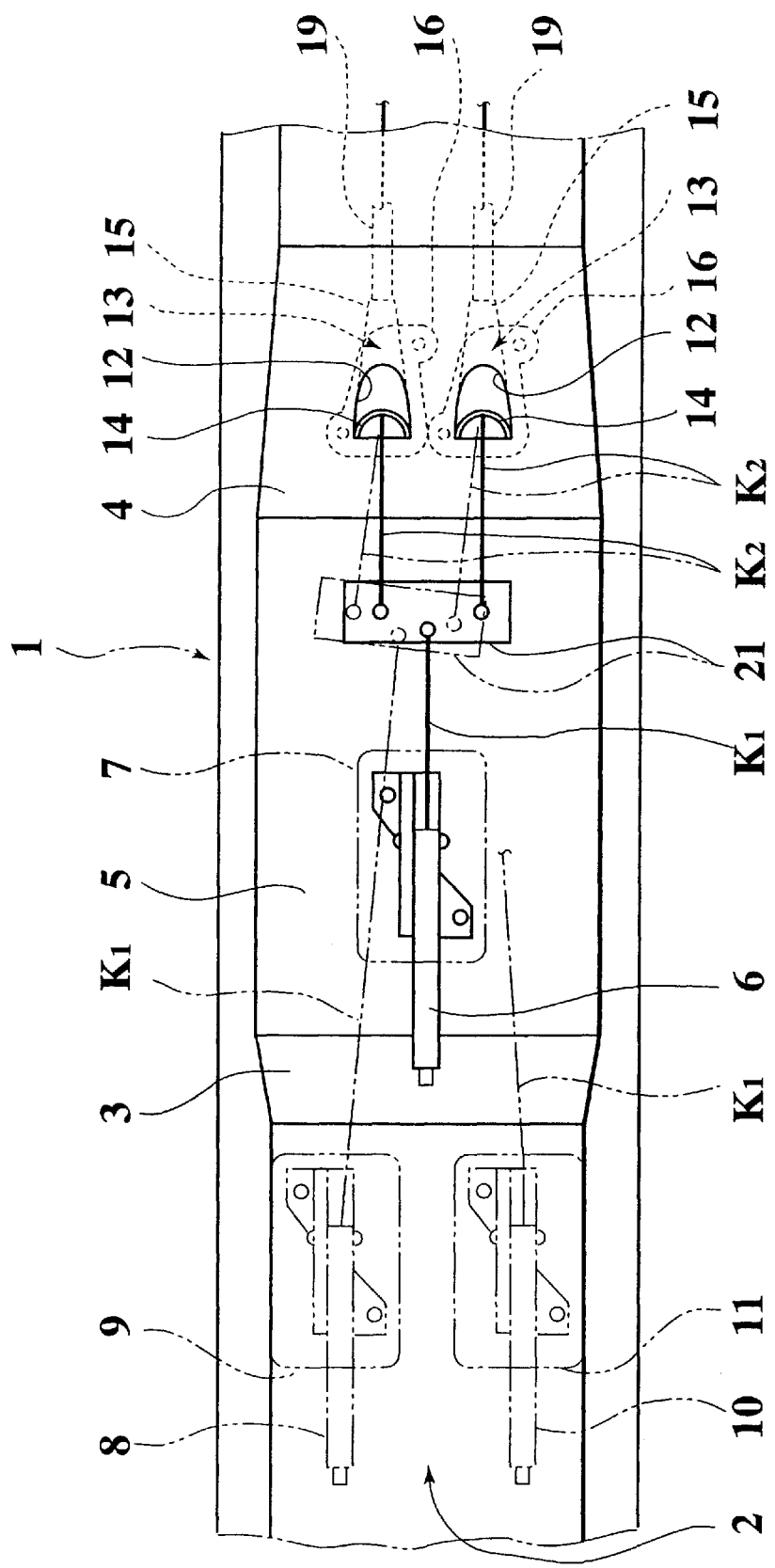
FIG.1 is a plan view showing a floor tunnel according to an embodiment of the present invention.

A structure for arranging a parking-brake lever according to a preferred embodiment of the present invention is explained in detail with reference to FIGS.1 to 4 hereinafter.

A floor tunnel 1 constituting a part of a floor of an automobile is formed in a center area of the floor in the width direction of the automobile. The floor tunnel 1 projects from the floor along the back and forth direction of the automobile. A flat area 5 is formed on an upper surface portion 2 of the floor tunnel 1. The flat area 5 is lowered in level from the upper surface portion 2 via front and rear inclined areas 3, 4.

A first position 7 for a first PKB lever 6 is provided in a center area of the flat area 5 in the width direction. The first PKB lever 6 is available for both the automobiles with the right-hand steering wheel and the left-hand steering wheel. On the upper surface portion 2 located in front of the flat area 5, a second position 9 for a second PKB lever 8 and a third position 11 for a third PKB lever 10 are provided on the right and left sides in the width direction respectively. The second PKB lever 8 is installed in the automobile with the righthand steering wheel. The third PKB lever 10 is installed in the automobile with the left-hand steering wheel.

Figure 2:
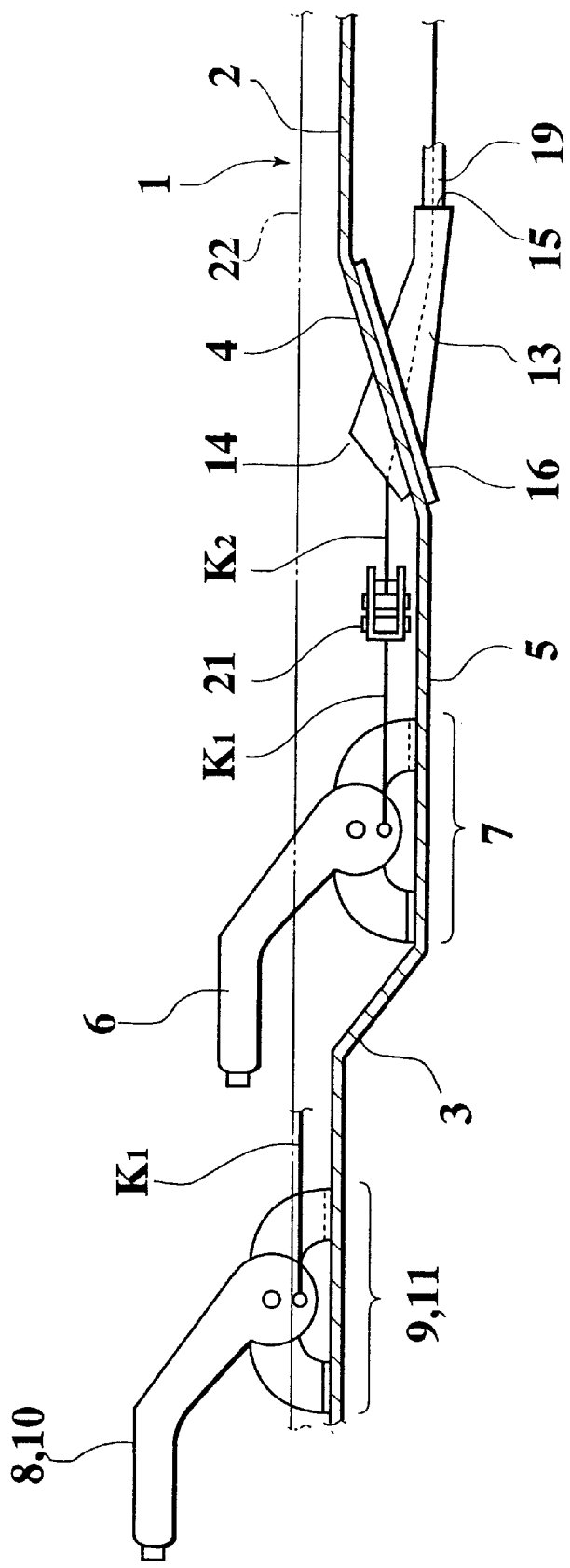
FIG.2 is a sectional view showing the floor tunnel shown in FIG.1.

A pair of right and left fitting holes 12 are formed on the rear inclined area 4 at the rear of the flat area 5. The fitting holes 12 are formed like a substantial semi-ellipse which has a linear edge portion 12a at its front end respectively. As shown in FIG.2, supporting pipes 13 are fitted into the fitting holes 12 from the lower surface side, i.e., the inner side of the floor tunnel 1 respectively. Each of the supporting pipes 13 has a front end opening area 14 and a rear end opening area 15. Each of the front opening areas 14 has a forward-expanded flare shape. Each of the rear end opening areas 15 has a diameter which is set smaller than the front end opening area 14. An inner diameter of the supporting pipe 13 is made gradually small from the front end opening area 14 to the rear end opening area 15, so that the supporting pipe 13 has a taper shape as a whole.

Figure 3:
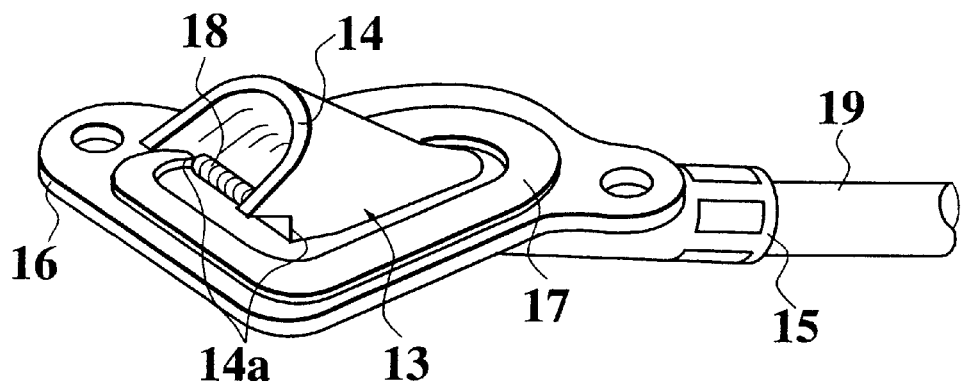
FIG.3 is a perspective view showing a supporting pipe shown in FIG.2.
Figure 4:
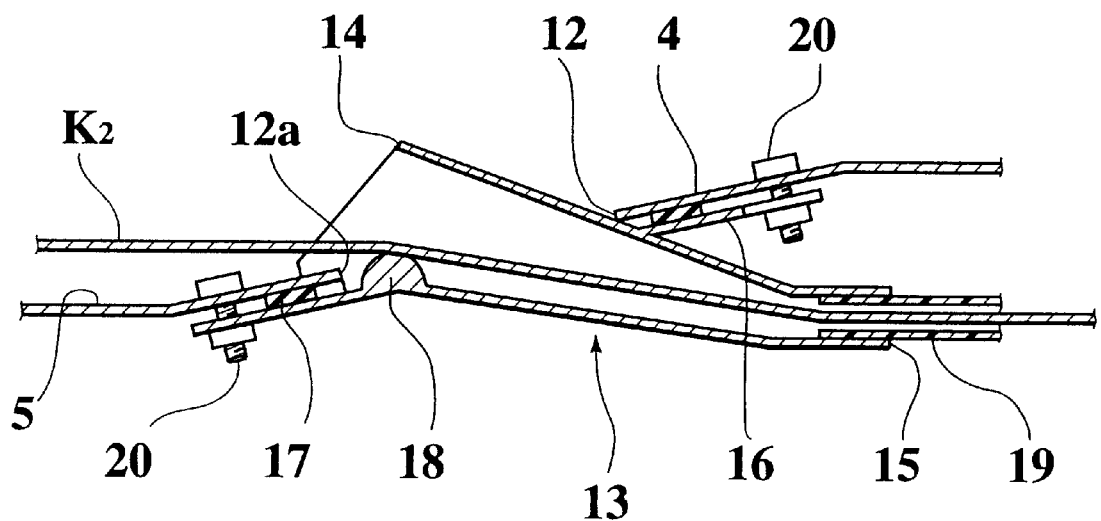
FIG.4 is a sectional view showing a fitted state of the supporting pipe shown in FIG.1.

As shown in FIG.3, a flange-like bracket 16 is provided around an outer periphery of the supporting pipe 13 to be inclined relative to an axis of the supporting pipe 13. A ring-like rubber sealing member 17 is provided on an upper surface of the bracket 16 to surround the supporting pipe 13. Notches 14a are formed at the lower end positions on both right and left sides of the front end opening area 14 of the supporting pipe 13. As shown in FIG. 4, a projection 18 having its curved or rounded upper surface is formed below the front end opening area 14 along the width direction.

Front end portions of outer tubes 19 are connected to the rear end opening areas 15 of the supporting pipes 13 by virtue of caulking respectively. The outer tubes 19 are provided to extend to parking-brake mechanisms (not shown) provided to the rear wheels.

The way how to fit the supporting pipe 13 is explained in the following.

First, the front end opening area 14 of the supporting pipe 13 is inserted into the fitting hole 12 from the inner side of the floor tunnel 1. Then, the notches 14a being formed on the front end opening area 14 are engaged with front edge 12a of the fitting hole 12. At this time, the supporting pipe 13 is temporarily held and positioned with respect to the fitting hole 12. Then, diagonally opposing end portions of the bracket 16 are secured to the peripheral portion of the fitting hole 12 by bolt and nut means 20 respectively. In this case, watertightness of the fitting holes 12 is kept by the sealing member 17 provided on the upper surface of the bracket 16.

Next, with the use of the supporting pipes 13 fitted as above, the cable Kl extended from one of the first PKB lever 6, the second PKB lever 8 and the third PKB lever 10 via the cables K2 is introduced into the inside of the floor tunnel 1.

In other words, the cable K1 extended from the first PKB lever 6 is branched off into two cables K2 via the equalizer 21 arranged on the upper surface portion 2 of the floor tunnel 1. The cables K2 are then introduced into the supporting pipes 13 via the flare-shaped front end opening areas 14 so as to extend through the outer tubes 19 respectively and then coupled with the parking-brake mechanisms (not shown) positioned on the right and left rear wheels respectively.

In contrast, since the second PKB lever 8 or the third PKB lever 10 is mounted on one of both side positions of the upper surface portion 2 in the width direction, both the cable Kl and the cables K2 branched from the cable Kl via the equalizer 21 are inclined relative to the supporting pipes 13 (as indicated by chain double-dashed lines in FIG.1). However, because the front end opening areas 14 of the supporting pipes 13 are formed like the flare shape, the cables K2 can be introduced smoothly into the inside of the floor tunnel 1 even if the cable Kl is extended obliquely from the second PKB lever 8 or the third PKB lever 10.

As shown in FIG. 2, a console 22 is arranged over the floor tunnel 1 on which one of the first PKB lever 6, the second PKB lever 8, and the third PKB lever 10 is provided selectively. The first PKB lever 6, the second PKB lever 8, or the third PKB lever 10 is protruded upward from an opening area (not shown) formed on the console 22. A bellows-type boots is provided on the opening area (not shown) of the console 22 so as to cover the opening area while allowing an operation of one of the first PKB lever 6, the second PKB lever 8, and the third PKB lever 10.

In this manner, in the present embodiment, all the structures of the first PKB lever 6, the second PKB lever 8, and the third PKB lever 10 are mounted to the automobile body only by putting on the upper surface portion 2 of the floor tunnel 1. Hence, only one type of the structure should be prepared as the structure for the PKB lever, whereby reduction in the number of parts can be yielded. Further, since a large size through bracket is not needed to mount the second PKB lever 8 or the third PKB lever 10, the number of parts can be reduced in this respect and also the tare, i.e., total automobile weight can be reduced. A dedicated type PKB lever may be employed as the first PKB lever 6, the second PKB lever 8, and the third PKB lever 10 respectively.

Also, in the present embodiment, since the supporting pipes 13 is fitted from the inner side of the floor tunnel 1, only the front end opening areas 14 of the supporting pipes 13 being inserted in the fitting holes 12 respectively are protruded from the upper surface portion 2 of the floor tunnel 1. Therefore, there is no interference with the cables K2 on the upper surface portion 2 of the floor tunnel 1. As a result, the cables K2 can be introduced without fail into the front end opening areas 14 of the supporting pipes 13.

Moreover, the projection 18 formed below the front end opening areas 14 of the supporting pipes 13 prevents from the cables K2 to come in contact with the edge portions 12a of the fitting holes 12. The projection 18 reduces contact resistance between the cables K2 and the supporting pipes 13. Since the equalizer 21 is provided on the upper surface portion 2 of the floor tunnel 1, a connection portion between the cable Kl and the equalizer 21 and connection portions between the cables K2 and the equalizer 21 are in no way exposed to the outside of the automobile body (the inside of the floor tunnel 1). As a result, the structure for the parking-brake lever of the present embodiment is advantageous to rust prevention.

What is claimed is:

1. A parking-brake structure, comprising:
   a parking brake mounted selectively to a first position on a floor of an automobile body or a second position on the floor which is located forward of the first position;
   a fitting hole formed through the floor at a position rear of the first position;
   a pipe member disposed through the fitting hole at a predetermined angle with respect to the floor so as to have a forward portion protruding above the floor and a rear portion protruding below the floor, the forward portion having a flared opening which flares outwardly and forwardly at a front end thereof; and
   a cable connected to the parking brake, the cable passing through the pipe member and extending rearwardly under the floor.

2. The structure according to claim 1, wherein the pipe member has a bracket which projects from an outer peripheral surface thereof and which is connected to a lower surface of the floor about a periphery of the fitting hole.

3. The structure according to claim 2, wherein
   the pipe member has engaging portion engageable with a front edge of the fitting hole.

4. A parking brake structure comprising:
   a parking brake mounted selectively to a first position on a floor of an automobile body or a second position in front of the first position on the floor;
   a fitting hole formed through the floor at a position rear of the first position;
   a pipe member disposed through the fitting hole, the pipe member having a flared forward opening area which is located above the floor and expanded forwardly;

a cable connected to the parking brake, the cable extending rearwardly and passing through the opening area so as to extend through the floor; and a sealing member inserted between the bracket and the floors, wherein the pipe member has a bracket which projects from an outer peripheral surface thereof and which is connected to a lower surface of the floor about a periphery of the fitting hole.

5. The structure according to claim 4, wherein the bracket projects annularly from the outer peripheral surface of the pipe member, and the sealing member has a ring shape.

6. A parking brake structure comprising:

a parking brake mounted selectively to a first position on a floor of an automobile body or a second position in front of the first position on the floor;

a fitting hole formed through the floor at a position rear of the first position;

a pipe member disposed through the fitting hole, the pipe member having a flared forward opening area which is located above the floor and expanded forwardly; and a cable connected to the parking brake, the cable extending rearwardly and passing through the opening area so as to extend through the floor;

wherein the pipe member has a bracket projected from an outer peripheral surface thereof To be fitted about a periphery of the fitting hole on an underside surface of the floor;

wherein the pipe member has engaging portion engageable with a front edge of the fitting hole; and wherein the engaging portion is a notch formed at a front lower end of the opening area.

7. A parking brake structure, comprising:

a parking brake capable of being mounted selectively to a first position on a floor of an automobile body or a second position in front of the first position on the floor;

a fitting hole formed in the floor at a position rear of the first position;

a pipe member disposed through The fitting hole, the pipe member having a flared forward opening area which is located above the floor and expanded forwardly; and a cable connected to the parking brake, the cable extending rearwardly and passing through the opening area so as to extend through the floor;

wherein the pipe member has a projection from a bottom inner surface of the opening area into the fitting hole, and the projection being capable of coming into contact with the cable.

8. The structure according to claim 7, wherein the projection is positioned in close proximity to a front edge of the fitting hole to prevent interference between the cable a front edge of the fitting hole.

9. The structure according to claim 7, wherein the projection includes a curved surface capable contactable with the cable.

10. A pipe member for a cable, the pipe member being fitted through a fitting hole formed in a floor of an automobile body, the cable passing through the pipe member, the pipe member comprising:

a pipe main body having a front opening area which has a substantially flared shape that expands forward;

a bracket protruded from an outer surface of the pipe main body, the bracket being secured to a lower surface of the floor about a periphery of the fitting hole, the pipe main body passing through the fitting hole so that the front opening is oriented forward over the floor;

a projection protruded from a bottom inner surface of the front opening area into the fitting hole to come into contact with the cable; and an engaging portion provided at a lower end position of the front opening area and engaged with a front edge of the fitting hole.

11. The pipe member according to claim 10, wherein the projection includes a curved surface capable of contact with the cable.

12. A parking-brake structure, comprising:

a parking brake capable of being mounted selectively to a first position on a floor of an automobile body or a second position in front of the first position on the floor;

a pair of fitting holes formed in the floor rear of the first position;

a pair of pipe members respectively fitted through the fitting holes, the pipe members having flared out forwardly extending opening areas which are oriented forward and located above the floor;

a first cable connected to the parking brake which extends rearwardly toward the pair of pipe members;

an equalizer connected to the first cable; and a pair of second cables which are connected to the equalizer and which respectively pass though a pipe member.

* * * * *